United States Patent
Baum et al.

(10) Patent No.: US 9,909,021 B2
(45) Date of Patent: Mar. 6, 2018

(54) METHOD FOR PRODUCING A COATING AGENT

(71) Applicant: THOR GMBH, Speyer (DE)

(72) Inventors: Rüdiger Baum, Waghausel (DE); Peter Erich Hahn, Lampertheim (DE); Thomas Wunder, Neustadt a.d. Weinstrasse (DE)

(73) Assignee: THOR GMBH, Speyer (DE)

( * ) Notice: Subject to any disclaimer, the term of this patent is extended or adjusted under 35 U.S.C. 154(b) by 0 days.

(21) Appl. No.: 15/102,274

(22) PCT Filed: Dec. 3, 2014

(86) PCT No.: PCT/EP2014/003216
§ 371 (c)(1),
(2) Date: Jun. 6, 2016

(87) PCT Pub. No.: WO2015/082063
PCT Pub. Date: Jun. 11, 2015

(65) Prior Publication Data
US 2016/0312046 A1    Oct. 27, 2016

(30) Foreign Application Priority Data

Dec. 6, 2013 (EP) .................... 13005689

(51) Int. Cl.
| C09D 5/14 | (2006.01) |
| C09D 5/16 | (2006.01) |
| C09D 7/12 | (2006.01) |
| C09D 5/00 | (2006.01) |

(52) U.S. Cl.
CPC ............. C09D 7/1233 (2013.01); C09D 5/00 (2013.01)

(58) Field of Classification Search
None
See application file for complete search history.

(56) References Cited

U.S. PATENT DOCUMENTS

2010/0186631 A1*  7/2010  Baum ................. A01N 43/80
106/287.2

FOREIGN PATENT DOCUMENTS

| EP | 0676140 A1 | 10/1995 |
| EP | 0900525 A1 | 3/1999 |
| EP | 1005271 B1 | 11/2002 |
| WO | 99/08530 A1 | 2/1999 |
| WO | 02/17716 A1 | 3/2002 |
| WO | 2007/026004 A2 | 3/2007 |

OTHER PUBLICATIONS

International Search Report for PCT/EP2014/003216 dated Mar. 17, 2015.

* cited by examiner

*Primary Examiner* — Yun Qian
(74) *Attorney, Agent, or Firm* — Hedman & Costigan, P.C.; James V. Costigan; Kathleen A. Costigan

(57) ABSTRACT

The present invention relates to a method for producing a coating agent, such as a paint or a plaster, having a 5-chloro-2-methyl-4-isothiazolone content in the range from 0 to 1 ppm, using components which would introduce in total more than 1.5 ppm of 5-chloro-2-methyl-4-isothiazolone into the coating agent. The method comprises the steps: a) decomposing the 5-chloro-2-methyl-4-isothiazolone present in the components of the coating agent with the help of at least one 5-chloro-2-methyl-4-isothiazolone-decomposing compound, such that the content of 5-chloro-2-methyl-4-isothiazolone is in a range from 0 to 1 ppm over the course of a period of less than 24 hours, b) mixing the individual constituents of the coating agent, not definitively selected from the group comprising water, binder, pigment, wetting agent, thickener, thixotropic agent, pH regulating compounds, fillers and dispersants, and c) adding at least one preservative selected from the group consisting of 2-methylisothiazolin-3-one, 1,2-benzisothiazolin-3-one, N-methyl-1,2-benzisothiazolin-3-one and 2-n-octylisothiazolin-3-one.

6 Claims, No Drawings

METHOD FOR PRODUCING A COATING AGENT

The present invention relates to a method for producing a coating agent, such as a paint or a plaster, having a 5-chloro-2-methyl-4-isothiazolone content in the range from 0 to 1 ppm, using components which would introduce in total more than 1.5 ppm of 5-chloro-2-methyl-4-isothiazolone into the coating agent.

Preservatives are used in many aqueous systems to control microbial growth. An important area of application is the preservation of coating agents, such as paints and plasters, since these are subject to microbiological degradation and rot if no preservatives are added to them.

In order to ensure long term durability of the coating agents, the majority of all nowadays available coating agents based on water for interior and exterior paints are therefore admixed with preservatives from the family of isothiazolinones.

In this connection, for example, the mixture, disclosed in EP 1 005 271 B1, of the isothiazolinones 2-methylsothiaznlin-3-one (MIT) and 1,2-benzisothiazolin-3-one (BIT), is used. This mixture is sold by Thor GmbH (Speyer, Federal Republic of Germany) as Acticide® MBS and at the current time constitutes the standard in the pack preservation of water-based paints and plasters and has the advantage that, through the targeted selection of the two isothiazolinones, it combines high efficacy with a low sensitization potential.

The fact that contact with isothiazolones can trigger allergic reactions has been known for years. In this connection, 5-chloro-2-methyl-4-isothiazolone (CIT) has by far the greatest sensitizing potential. However, since it has an antimicrobial efficacy that is up to 100 times higher compared to 2-methylisothiazolin-3-one (MIT), it is still used in the preservation of constituents for coating agents such as paints or plasters.

An essential constituent of paints and plasters is the binder and/or the polymer emulsion which, prior to producing the corresponding coating agent, mostly already comprises the inexpensive and highly effective 5-chloro-2-methyl-4-isothiazolone in an amount in the range from 5 to 20 ppm. This leads to a coating agent manufacturer producing a coating agent with a significant content of 5-chloro-2-methyl-4-isothiazolone when using such a polymer emulsion.

On account of the comparatively high sensitizing potential of 5-chloro-2-methyl-4-isothiazolone, however, it is desirable that this is present in coating agents in the smallest possible amounts, in a range from 0 to 1 ppm.

It is therefore an object of the present invention to provide a method with which it is possible, using components which would introduce in total more than 1.5 ppm of 5-chloro-2-methyl-4-isothiazolone into a coating agent, to produce a coating agent selected from paints and plasters having a 5-chloro-2-methyl-4-isothiazolone content in the range from only 0 to 1 ppm.

This object is achieved by a method for producing a coating agent selected from paints and plasters having a 5-chloro-2-methyl-4-isothiazolone content in the range from 0 to 1 ppm, using components which would introduce in total more than 1.5 ppm of 5-chloro-2-methyl-4-isothiazolone into the coating agent, comprising the steps:

a) decomposing the 5-chloro-2-methyl-4-isothiazolone present in the components of the coating agent with the help of at least one 5-chloro-2-methyl-4-isothiazolone-decomposing compound, such that the content of 5-chloro-2-methyl-4-isothiazolone is in a range from 0 to 1 ppm over the course of a period of less than 24 hours, b) mixing the individual constituents of the coating agent, not definitively selected from the group comprising water, binder, pigment, wetting agent, thickener, thixotropic agent, pH regulating compounds, fillers and dispersants, and c) adding at least one preservative selected from the group consisting of 2-methylisothiazolin-3-one (MIT), 1,2-benzisothiazolin-3-one (BIT), benzisothiazolin-3-one (M-BIT) and 2-n-octylisothiazolin-3-one (OTT).

The method according to the present invention is advantageously characterized by the fact that the method makes it possible, using components which would introduce in total more than 1.5 ppm of 5-chloro-2-methyl-4-isothiazolone into the coating agent, to produce a coating agent having a negligibly low content of 5-chloro-2-methyl-4-isothiazolone, such that the allergenic effect of 5-chloro-2-methyl-4-isothiazolone on the end user can be at least largely minimized.

A further advantage of the method according to the invention is that, with the help of the at least one compound used in method step a), the 5-chloro-2-methyl-4-isothiazolone is virtually selectively degraded over the course of a period of 24 hours without the isothiazolinones used for further preserving the coating agent, which belong to the same chemical family as 5-chloro-2-methyl-4-isothiazolone, being decomposed.

In the context of the present invention, coating agent means a water-based paint or a plaster. The paint here can be a paint for interiors or a paint for exteriors. The plaster can likewise be a plaster for exteriors or for interiors. According to a preferred embodiment of the invention, the coating agent is a paint with a pH in the range from 7.5 to 10, preferably a paint with a pH in the range from 7.5 to 9.0. According to a preferred embodiment of the invention, the coating agent is a plaster with a pH in the range from 8 to 11, preferably a paint with a pH in the range from 8.5 to 10.5.

In the context of the present invention, producing the coating agent using components which would introduce in total more than 1.5 ppm of 5-chloro-2-methyl-4-isothiazolone into the coating agent means at the total amount of 5-chloro-2-methyl-4-isothiazine which by the individual components at are used for producing the coating agent, based on the finished coating agent, is in total more than 1.5 ppm. According to the invention, the total content of 5-chloro-2-methyl-4-isothiazolone which is introduced by the individual constituents of the coating agent, based on the total coating agent, is more than 1.5 ppm. According to a preferred embodiment of the invention, the total content is more than 2.0 ppm, according to a more preferred embodiment the total content is more than 3.0 ppm.

In step a) of the method according to the invention, the 5-chloro-2-methyl-4-isothiazolone present in the components which are used for producing the coating agent is decomposed or degraded with the help of at least one 5-chloro-2-methyl-4-isothiazolone-decomposing compound such that the content of 5-chloro-2-methyl-4-isothiazolone is still only a range from 0 to 1 ppm over the course of a period of less than 24 hours, based on the total coating agent.

In the context of the present invention, "decomposing the 5-chloro-2-methyl-4-isothiazolone" means that the 5-chloro-2-methyl-4-isothiazolone present in the components is irreversibly decomposed or degraded during the production of the coating agent within a period of up to 24 hours, preferably within a period of 0.5 to 12 hours, particularly preferably within a period of 2 to 6 hours, such that, after this period, the content of 5-chloro-2-methyl-4-isothiazolone, based on the produced coating agent, is in the range from 0 to 1 ppm, preferably in the range from 0 to 0.5 ppm, particularly preferably in the range from 0 to 0.2 ppm. Within a period of up to 24 hours means here that the total 5-chloro-2-methyl-4-isothiazolone which is present in the components that are used for producing the coating agent is decomposed within 24 hours from the point of contact with the at least one 5-chloro-2-methyl-4-isothiazolone-decomposing compound, such that the total content of 5-chloro-2-methyl-4-isothiazolone after these 24 hours is in the range from 0 to 1 ppm, based on the coating agent.

The decomposition of the 5-chloro-2-methyl-4-isothiazolone can take place at any point during the production of the coating agent. The agent for decomposing the 5-chloro-2-methyl-4-isothiazolone can therefore be initially introduced at the start of the production of the coating agent. The agent for decomposing the 5-chloro-2-methyl-4-isothiazolone can likewise also be added during or after the addition of the individual components of the coating agent. According to one embodiment of the invention, the agent for decomposing the 5-chloro-2-methyl-4-isothiazolone can be added all at once or in portions.

In the context of the present invention, agent for decomposing the 5-chloro-2-methyl-4-isothiazolone means a compound which decomposes and/or deactivates the 5-chloro-2-methyl-4-isothiazolone by chemical reaction the agent for decomposing the 5-chloro-2-methyl-4-isothiazolone results here in the content of 5-chloro-2-methyl-4-isothiazolone introduced by the components of the coating agent being reduced in the coating agent to the content in the range from 0 to 1 ppm over the course of time periods defined above. Agents and/or compounds of this type are known to the person skilled in the art. Selection of these is therefore customary expertise.

According to a preferred embodiment of the invention, the agent for decomposing the 5-chloro-2-methyl-4-isothiazolone is at least one thiol compound.

According to a particularly preferred embodiment of the invention, the agent for decomposing the 5-chloro-2-methyl-4-isothiazolone is at least one compound which is selected from the group consisting of cysteine, mercaptopyridine, dithiothreitol, glutathione, mercaptoethansulfonate, pyrithione and sodium formaldehyde sulfoxylate. According to a preferred embodiment, the pyrithione is a complex of pyrithione with a solubility in water at room temperature of more than 100 mg/l.

According to a particularly preferred embodiment of the invention, the agent for decomposing the 5-chloro-2-methyl-4-isothiazolone is cysteine.

According to a further embodiment of the invention, the agent for decomposing the 5-chloro-2-methyl-4-isothiazolone is at least one zinc complex of cysteine.

The amount of the compound(s) used for decomposing the 5-chloro-2-methyl-4-isothiazolone, or its molar ratio to the 5-chloro-2-methyl-4-isothiazolone introduced by the components can vary over wide ranges. Usually, the molar ratio of the originally present 5-chloro-2-methyl-4-isothiazolone to the at least one compound with which this is decomposed is in the range from 20:1 to 1:20, preferably in the range from 5:1 to 1:5, particularly preferably in the range from 2:1 to 1:2.

According to one embodiment of the invention, the method according to the invention is characterized in that, for the decomposition of the 5-chloro-2-methyl-4-isothiazolone in method step a), cysteine is added in an amount in the range from 1 to 200 ppm, preferably 5 to 25 ppm, based on the produced coating agent.

In step b) of the method according to the invention, the individual constituents of the coating agent, not definitively selected from the group consisting of water, binder, pigment, wetting agent, thickener, thixotropic agent, pH regulating compounds, fillers and dispersants, are mixed together. The individual constituents of the coating agent, as well as their respective fractions vary here depending on the coating agent to be produced. However, it is within the scope of customary expertise to select the individual constituents, and to add them in a corresponding amount during the production of the desired coating agent in a corresponding amount.

According to one embodiment of the invention, in method step b), a component of the coating agent to be produced used is a binder or a polymer emulsion, whose content of 5-chloro-2-methyl-4-isothiazolone is in the range from 5 to 30 ppm or in the range from 5 to 20 ppm. The use of such a binder or of such a polymer emulsion which, with a fraction of from 5 to 50% by weight or 10 to 25% by weight, based on the coating agent, constitutes one of the main constituents of the coating agent, leads to, in most cases merely through the use of such a binder, a coating agent having a content of 5-chloro-2-methyl-4-isothiazolone of more than 1.5 ppm being obtained. The method according to the present invention, however, makes it possible to decompose the 5-chloro-2-methyl-4-isothiazolone virtually selectively. As a result of this measure, a coating agent with a virtually negligible sensitizing potential brought about by 5-chloro-2-methyl-4-isothiazolone is obtained.

As a result of the decomposition of the 5-chloro-2-methyl-4-isothiazolone and/or as a result of the degradation of the 5-chloro-2-methyl-4-isothiazolone, the produced coating agent would be virtually free from preservatives, and would be subject to microbiological degradation and would rot If no new preservatives were to be added to it. Consequently, in the course of the method according to the invention, in method step c) at least one preservative selected from the group consisting of 2-methylisothiazolin-3-one (MIT), 1,2-benzisothiazolin-3-one (BIT), N-methyl-1,2-benzisothiazolin-3-one (M-BIT) and 2-n-octylisothiazolin-3-one (OIT) is added. Further preservatives that can be added in addition to the at least one preservative specified above are selected from the group 3-iodo-2-propinyl N-butylcarbamate (IPBC), 2-bromo-2-nitropropane-1,3-diol (Bronopol), formaldehyde, zinc pyrithione and dibromo-3-nitrilipropionamide. The aforementioned preservatives can be added during the production of the coating agent before, during or after the decomposition of the 5-chloro-2-methyl-4-isothiazolone.

The use concentrations of the preservatives added in method step c) are, based on all of the added preservatives, usually in the range from 10 to 1000 ppm, preferably in the range from 20 to 500 ppm, and particularly preferably in the range from 30 to 200 ppm, based on the concentration thereof in the finished coating agent.

According to a preferred embodiment of the invention, in method step c) a mixture of 2-methylisothiazolin-3-one (MIT) and 1,2-benzisothiazolin-3-one (BIT) in the weight ratio of 5:1 to 1:5, preferably in the weight ratio from 2:1 to 1:1, is added as preservative.

In the context of the invention, it has surprisingly been found that the at least one preservative from the family of the isothiazolinones added in method step c) is decomposed and/or degraded by the 5-chloro-2-methyl-4-isothiazolone-decomposing compound only to a small extent. It was thus established that the at least one preservative added in method step C) in the coating agent is decomposed and/or degraded over a period of 24 hours to less than 10% by weight, preferably to less than 5% by weight, by the 5-chloro-2-methyl-4-isothiazolone-decomposing compound. The method according to the invention is characterized in this case advantageously by the fact that the 5-chloro- 2-methyl-4-isothiazolone-decomposing compound decomposes the 5-chloro-2-methyl-4-isothiazolone virtually completely and selectively, but the preservatives that originate from the same chemical family as the 5-chloro-2-methyl-4-isothiazolone and are added in method step c) are decomposed to a barely noteworthy extent.

According to a preferred embodiment of the invention, in method step c), a mixture or 2-methylisothiazolin-3-one and 1,2-benzisothiazolin-3-one in the weight ratio of 5:1 to 1:5, preferably in the weight ratio of 2:1 to 1:1, is added as preservative, and this is decomposed within a period of 24 hours by the at least one 5-chloro-2-methyl-4-isothiazolone-decomposing compound after first contact therewith to less than 10% by weight, preferably to less than 5% by weight.

According to a particularly preferred embodiment of the invention, in method step c), a mixture of 2-methylisothiazolin-3-one and 1,2-benzisothiazolin-3-one in the weight ratio of 5:1 to 1:5, preferably in the weight ratio of 2:1 to 1:1, is added as preservative, and the 5-chloro-2-methyl-4-isothiazolone-decomposing compound used is cysteine. The use amount of the mixture of 7-methylisothiazolin-3-one and 1,2-benzisothiazolin-3-one here is preferably 30 to 200 ppm (based on the mixture), and the use amount of cysteine is 5 to 200 ppm, in each case based on the coating agent.

According to a preferred embodiment, the present invention relates to a method for producing a coating agent selected from paints and plasters having a 5-chloro-2-methyl-4-isothiazolone content in the range from 0 to 1 ppm, using components which would introduce in total more than 1.5 ppm of 5-chloro-2-methyl-4-isothiazolone into the coating agent, comprising the steps:
  a) decomposing the 5-chloro-2-methyl-4-isothiazolone present in the components of the coating agent with the help of cysteine, such that the content of 5-chloro-2-methyl-4-isothiazolone is in a range from 0 to 1 ppm over the course of a period of less than 24 hours,
  b) mixing the individual constituents of the coating agent, not definitively selected from the group comprising water, binder, pigment, wetting agent, thickener, thixotropic agent, pH regulating compounds, fillers and dispersants, and
  c) adding at least one preservative selected from the group consisting of 2-methylisothiazolin-3-one and 1,2-benzisothiazolin-3-one or a mixture of 2-methylisothiazolin-3-one and 1,2-benzisothiazolin-3-one.

The invention relates to a method for producing a coating agent comprising the method steps a), b) and c). This is to be understood as meaning that the method steps a), b) and c) are to be carried out in any desired order during the production of the coating agent.

The present invention also relates to a coating agent in the form of a paint or a plaster produced by the method as described above.

The examples below serve to further illustrate the present invention:

EXAMPLE 1

Starting from a base formulation, a water-based emulsion paint based on latex with a pH of 7.5 was produced. The content of 5-chloro-2-methyl-4-isothiazolone content introduced by the individual constituents of the paint was 6 ppm. After producing the paint, the preservative added was a mixture of methylisothiazolin-3-one (MIT) and 1,2-benzisothiazolin-3-one (BIT). Thereafter, the inhibitors given in table 1 are added in varying amounts. The individual samples are analyzed directly after adding the inhibitor (0 hours), and also after 2 and 24 hours as well as after 3 months as to their content of 5-chloro-2-methyl-4-isothiazolone (CMIT), 2-methylisothiazolin-3-one (MIT) and 1,2-benzisothiazolin-3-one (BIT). The experimental results are shown in table 1.

TABLE 1

| Time | 0 h | | | 2 h | | | 24 h | | | 3 months | | | |
|---|---|---|---|---|---|---|---|---|---|---|---|---|---|
| Sample | MIT | CIT | BIT | MIT | CIT | BIT | MIT | CIT | BIT | MIT | CIT | BIT | Inhibitor |
| 1 | 95 | 6 | 88 | 94 | 6 | 88 | 95 | 6 | 88 | 94 | 2 | 79 | Blank |
| 2 | 95 | 6 | 88 | 90 | 5 | 82 | 89 | n.d. | 80 | 86 | n.d | 78 | 50 ppm sodium formaldehyde sulfoxylate |
| 3 | 95 | 6 | 88 | 91 | 6 | 82 | 90 | 1 | 82 | 88 | n.d | 76 | 10 ppm sodium formaldehyde sulfoxylate |
| 4 | 95 | 6 | 88 | 95 | n.d. | 85 | n.a. | n.a. | n.a | 91 | n.d | 75 | 50 ppm cysteine |
| 5 | 95 | 6 | 88 | 94 | 1 | 87 | 93 | n.d. | 86 | 92 | n.d | 77 | 10 ppm cysteine |
| 6 | 95 | 6 | 88 | 92 | n.d. | 85 | n.a. | n.a. | n.a | 90 | n.d | 73 | 50 ppm mercaptopyridine |
| 7 | 95 | 6 | 88 | 92 | 3 | 86 | 93 | n.d. | 85 | 91 | n.d | 75 | 10 ppm mercaptopyridine |
| 8 | 95 | 6 | 88 | 90 | 2 | 83 | 91 | n.d. | 84 | 89 | n.d | 75 | 10 ppm dithiothreitol |
| 9 | 95 | 6 | 88 | 92 | 3 | 85 | 91 | n.d. | 84 | 90 | n.d | 74 | 10 ppm glutathione |
| 10 | 95 | 6 | 88 | 94 | 1 | 83 | n.a. | n.d. | n.a. | 89 | n.d | 73 | 10 ppm Na-2-mercaptoethansulfonate |

Contents of MIT, CMIT and BIT in each case given in ppm.
n.d. = not detectable,
n.a. = not analyzed It is evident from the experimental results shown in table 1 that the content of 5-chloro-2-methyl-4-isothiazolone in the coating agent can be reduced to a range below 1 ppm by adding the inhibitor over the course of a period of 24 hours without the other isothiazolones present as preservatives being degraded to a comparable extent.

EXAMPLE 2

Starting from a base formulation, a water-based emulsion paint based on latex with a pH of 8.5 was produced. The content of 5-chloro-2-methyl-4-isothiazolone content introduced by the individual constituents of the paint was 6 ppm. After producing the paint, a mixture of methylisothiazolin-3-one (MIT) and 1,2-benzisothiazolin-3-one (BIT) was added as preservative. Thereafter, the inhibitors given in table 1 are added in varying amounts. The individual samples are analyzed directly after adding the initiator (0 hours), as well as after 24 hours and after 3 months as to their content of 5-chloro-2-methyl-4-isothiazolone (CMIT), 2-methylisothiazolin-3-one (MIT) and 1,2-benzisothiazolin-3-one (BIT). The experimental results are shown in table 2.

TABLE 2

| Time | 0 h | | | 24 h | | | 3 months | | | |
|---|---|---|---|---|---|---|---|---|---|---|
| Sample | MIT | CIT | BIT | MIT | CIT | BIT | MIT | CIT | BIT | Inhibitor |
| 1 | 105 | 6 | 91 | 106 | 6 | 90 | 104 | 2 | 78 | Blank |
| 2 | 105 | 6 | 91 | 104 | n.d. | 90 | 101 | n.d. | 73 | 100 ppm sodium formaldehyde sulfoxylate |
| 3 | 105 | 6 | 91 | 106 | n.d. | 92 | 100 | n.d. | 75 | 50 ppm sodium formaldehyde sulfoxylate |
| 4 | 105 | 6 | 91 | 107 | n.d. | 90 | 104 | n.d. | 77 | 10 ppm cysteine |
| 5 | 105 | 6 | 91 | 105 | n.d. | 92 | 105 | n.d. | 75 | 10 ppm mercaptopyridine |
| 6 | 105 | 6 | 91 | 103 | n.d. | 90 | 100 | n.d. | 75 | 10 ppm dithiothreitol |
| 7 | 105 | 6 | 91 | 103 | n.d. | 91 | 102 | n.d. | 76 | 10 ppm glutathione |
| 8 | 105 | 6 | 91 | 103 | n.d. | 91 | 101 | n.d. | 72 | 10 ppm Na-2-mercaptoethansulfonate |

Contents of MIT, CMIT and BIT in each case given in ppm.
n.d. = not detectable;
n.a. = not analyzed It is evident from the experimental results shown in table 2 that the content of 5-chloro-2-methyl-4-isothiazolone in the coating agent can be reduced to a range below 1 ppm by adding the inhibitor over the course of a period of 24 hours without the other isothiazolones present as preservatives being degraded to a comparable extent.

The invention claimed is:

1. A method for producing a coating agent selected from paints and plasters having a 5-chloro-2-methyl-4-isothiazolone content in the range from 0 to 1 ppm, wherein the total content of 5-chloro-2-methyl-4-isothiazolone which is introduced by the individual constituents of said coating agent, is mom than 1.5 ppm based on the total weight of coating agent, comprising the steps:
   a) decomposing the 5-chloro-2-methyl-4-isothiazolone present in the individual constituents of the coating agent with the help of at least one 5-chloro-2-methyl-4-isothiazolone-decomposing compound, such that the content of 5-chloro-2-methyl-4-isothiazolone, based on total weight of said coating agent is in a range from 0 to 1 ppm over the course of a period of less than 24 hours to form decomposed components of the coating agent,
   b) mixing the individual constituents of the coating agent, and
   c) adding at least one preservative selected from the group consisting of 2-methylisothiazolin-3-one (MIT), 1,2-benzisothiazolin-3-one (BIT), N-methyl-1,2-benzisothiazolin-3-one (M-BIT) and 2-n-octylisothiazolin-3-one (OIT).

2. The method as claimed in claim 1, characterized in that the 5-chloro-2-methyl-4-isothiazolone present in the individual constituents of the coating agent is decomposed with the help of at least one thiol compound.

3. The method as claimed in claim 1, characterized in that the 5-chloro-2-methyl-4-isothiazolone-decomposing compound is selected from the group consisting of cysteine, pyrithione, sodium pyrithione, mercaptopyridine, dithiothreitol, glutathione, mercaptoethansulfonate and sodium formaldehyde sulfoxylate.

4. The method claimed in claim 1, characterized in that weight ration of the total 5-chloro-2-methyl-4-isothiazolone present in the individual constituents that are used for producing the coating agent to the at least one 5-chloro-2-methyl-4-isothiazolone-decomposing compound with which 5-chloro-2-methyl-4-isothiazolone is decomposed, is in the range from 20:1 to 1:20.

5. The method as claimed in claim 1, characterized in that, in method step c), a mixture of 2-methylisothiazolin-3-one (MIT) and 1,2-benzisothiazolin-3-one (BIT) is added as preservative.

6. The method as claimed in claim 1, characterized in that, for the decomposition of the 5-chloro-2-methyl-4-isothiazolone in method step a), cysteine is added in an amount in the range from 1 to 200 ppm, based on the produced coating agent.

* * * * *